(12) United States Patent
Eidesmo et al.

(10) Patent No.: US 7,026,819 B2
(45) Date of Patent: *Apr. 11, 2006

(54) ELECTROMAGNETIC SURVEYING FOR MAPPING THE CONTENT OF SUBTERRANEAN RESERVOIRS

(75) Inventors: Terje Eidesmo, Ranheim (NO); Svein Ellingsrud, Trondheim (NO); Fan-Nian Kong, Oslo (NO); Harald Westerdahl, Dal (NO); Stale Johansen, Melhus (NO)

(73) Assignees: Statoil ASA, Stravanger (NO); Norgas Geotekniske Institut, Oslo (NO)

( * ) Notice: Subject to any disclaimer, the term of this patent is extended or adjusted under 35 U.S.C. 154(b) by 148 days.

This patent is subject to a terminal disclaimer.

(21) Appl. No.: 10/624,287

(22) Filed: Jul. 22, 2003

(65) Prior Publication Data

US 2004/0124842 A1 Jul. 1, 2004

Related U.S. Application Data

(63) Continuation of application No. 09/763,446, filed as application No. PCT/GB99/02823 on Aug. 26, 1999, now Pat. No. 6,628,119.

(30) Foreign Application Priority Data

Aug. 28, 1998 (GB) ............................... 9818875

(51) Int. Cl.
*G01V 3/08* (2006.01)
*G01V 3/12* (2006.01)

(52) U.S. Cl. ..................................... 324/337
(58) Field of Classification Search ................. 324/332, 324/334–339, 344, 347, 358, 359, 363, 364
See application file for complete search history.

(56) References Cited

U.S. PATENT DOCUMENTS

| | | |
|---|---|---|
| 2,077,707 A | 4/1937 | Melton |
| 2,531,088 A | 11/1950 | Thompson |
| 3,052,836 A | 9/1962 | Postma |
| 3,398,356 A | 8/1968 | Still |
| 3,548,299 A | 12/1970 | Duroux et al. |
| 3,806,795 A | 4/1974 | Morey |
| 3,836,960 A | 9/1974 | Gehman et al. |

(Continued)

FOREIGN PATENT DOCUMENTS

| | | |
|---|---|---|
| EP | 0087271 | 8/1983 |
| EP | 0219234 | 4/1987 |
| EP | 0512756 | 11/1991 |

(Continued)

OTHER PUBLICATIONS

Ellingsrud et al., "How Electromagnetic Sounding Technique Could be Coming to Hydrocarbon E & P", 20 First Break (Mar. 2002).

Eidesmo et al., "Sea Bed Logging (SBL), a new method for remote and direct identification of hydrocarbon filled layers in deepwater areas", 20 First Break (Mar. 2002).

(Continued)

*Primary Examiner*—Jay Patidar
(74) *Attorney, Agent, or Firm*—Patterson, Thuente, Skaar & Christensen, P.A.

(57) ABSTRACT

A method for mapping a submarine or subterranean reservoir by conducting an electromagnetic survey using an electromagnetic field in the form of a wave. An electromagnetic field is applied by a transmitter on the seabed and detected by antennae. The nature of the detected reflected waves is used to determine whether the reservoir contains water or hydrocarbons, which may then be produced from a well that penetrates the reservoir.

38 Claims, 1 Drawing Sheet

U.S. PATENT DOCUMENTS

Figure 1:
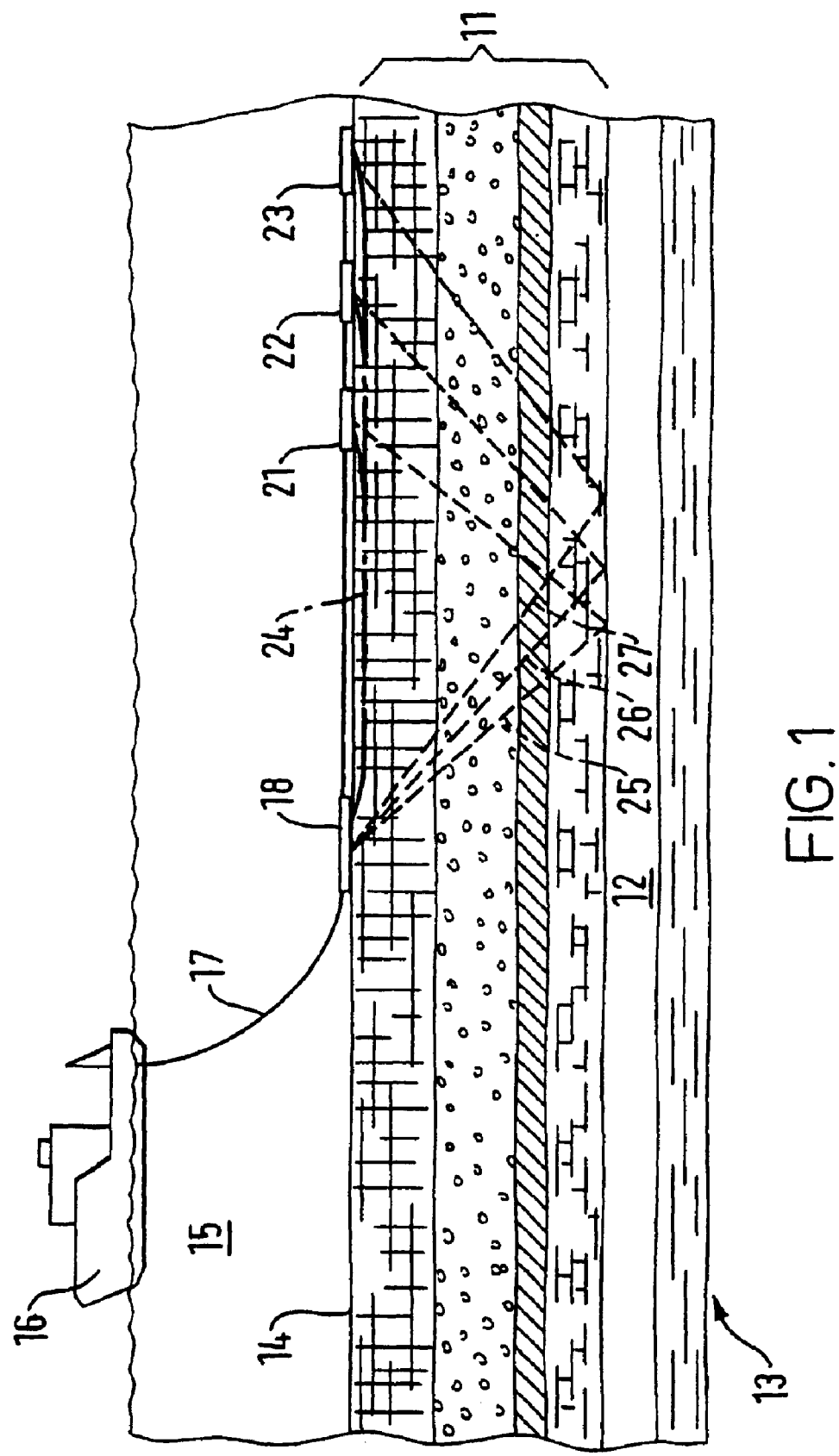

| | | |
|---|---|---|
| 4,010,413 A | 3/1977 | Daniel |
| 4,047,098 A | 9/1977 | Duroux |
| 4,079,309 A | 3/1978 | Seeley |
| 4,258,321 A | 3/1981 | Neale, Jr. |
| 4,258,322 A | 3/1981 | Rocroi et al. |
| 4,308,499 A | 12/1981 | Thierbach et al. |
| 4,417,210 A | 11/1983 | Rocroi et al. |
| 4,446,434 A | 5/1984 | Sternberg et al. |
| 4,451,789 A | 5/1984 | Meador |
| 4,489,276 A | 12/1984 | Yu |
| 4,506,225 A | 3/1985 | Loveless et al. |
| 4,547,733 A | 10/1985 | Thoraval |
| 4,594,551 A | 6/1986 | Cox et al. |
| 4,616,184 A | 10/1986 | Lee et al. |
| 4,617,518 A | 10/1986 | Srnka |
| 4,633,182 A | 12/1986 | Dzwinel |
| 4,652,829 A | 3/1987 | Safinya |
| 4,677,438 A | 6/1987 | Michiguchi et al. |
| 4,760,340 A | 7/1988 | Denzau et al. |
| 4,835,474 A | 5/1989 | Parra et al. |
| 5,025,218 A | 6/1991 | Ramstedt |
| 5,066,916 A | 11/1991 | Rau |
| 5,177,445 A | 1/1993 | Cross |
| 5,192,952 A | 3/1993 | Johler |
| 5,280,284 A | 1/1994 | Johler |
| 5,373,443 A | 12/1994 | Lee et al. |
| 5,400,030 A | 3/1995 | Duren et al. |
| H1490 H | 9/1995 | Thompson et al. |
| 5,486,764 A | 1/1996 | Thompson et al. |
| H1524 H | 4/1996 | Thompson et al. |
| H1561 H | 7/1996 | Thompson |
| 5,563,513 A | 10/1996 | Tasci et al. |
| 5,689,068 A | 11/1997 | Locatelli et al. |
| 5,767,679 A | 6/1998 | Schroder |
| 5,811,973 A | 9/1998 | Meyer, Jr. |
| 5,841,280 A | 11/1998 | Yu et al. |
| 5,877,995 A | 3/1999 | Thompson et al. |
| 5,886,526 A | 3/1999 | Wu |
| 5,892,361 A | 4/1999 | Meyer, Jr. et al. |
| 5,955,884 A | 9/1999 | Payton et al. |
| 6,002,357 A | 12/1999 | Redfern et al. |
| 6,023,168 A | 2/2000 | Minerbo |
| 6,060,885 A | 5/2000 | Tabarovsky et al. |
| 6,157,195 A | 12/2000 | Vail, III |
| 6,163,155 A | 12/2000 | Bittar |
| 6,184,685 B1 | 2/2001 | Paulk et al. |
| 6,188,221 B1 | 2/2001 | Van de Kop et al. |
| 6,188,222 B1 | 2/2001 | Seydoux et al. |
| 6,225,806 B1 | 5/2001 | Millar et al. |
| 6,246,240 B1 | 6/2001 | Vail, III |
| 6,339,333 B1 | 1/2002 | Kuo |
| 6,480,000 B1 | 11/2002 | Kong et al. |
| 2003/0048105 A1 | 3/2003 | Ellingsrud et al. |
| 2003/0052685 A1 | 3/2003 | Ellingsrud et al. |

FOREIGN PATENT DOCUMENTS

| | | |
|---|---|---|
| EP | 0814349 | 12/1997 |
| FR | 2479992 | 10/1981 |
| GB | 2155182 | 9/1985 |
| GB | 2256715 | 12/1992 |
| GB | 2301902 | 12/1996 |
| WO | WO 81/01617 | 6/1981 |
| WO | WO 96/06367 | 2/1996 |
| WO | WO 98/28638 | 7/1998 |
| WO | WO 00/00850 | 1/2000 |
| WO | WO 00/13037 | 3/2000 |
| WO | WO 00/13046 | 3/2000 |
| WO | WO 00/63718 | 10/2000 |
| WO | WO 01/55749 | 8/2001 |
| WO | WO 02/14906 A1 | 2/2002 |

OTHER PUBLICATIONS

Kaufman et al., "*EM Field of an Electric Dipole on the Surface of a Medium Containing a Thin Resistant Layer*", Frequency and Transient Soundings, publ. Elsevier, (1983).

Kaufman et al., *1981 Annual Meeting Abstracts: Marine EM Prospecting System*, 47 Geophysics 431 (1982).

Garg et al., "*Synthetic Electric Sounding Surveys Over Known Oil Fields*", 49 Geophysics 1959–67 (Nov. 1984).

Yuan et al., "*The Assessment of Marine Gas Hydrates Through Electrical Remote Sounding: Hydrate Without a BSR?*", 27 Geophys. Res. Letts. 204–217 (Aug. 15, 2000).

Edwards, "*On the Resource evaluation of Marine Gas Hydrate Deposits Using Sea–Floor Transient Electric Dipole–Dipole Methods*", 62 Geophysics 63–74 (Jan. 1997).

Chave et al., "*Some Comments on Seabed Propagation of ULF/ELF Electromagnetic Fields* ", 25 Radio Science 825–36 (Sep. 1990).

MacGregor et al., "*Use of Marine Controlled–Source Electromagnetic Sounding for Sub–Basalt Exploration* ", 48 Geophys. Prosp. 1091–1106 (Apr. 2000).

MacGregor et al., "*Marine Controlled Source Electromagnetic Sounding: Development of a Regularized Inversion for 2–Dimensional Resistivity Structures* ", 1 LITHOS Science Report 103–109 (Apr. 1999).

MacGregor et al., "*The RAMESSES Experiment—III. Controlled –Source Electromagnetic Sounding of the Reykjanes Ridge* ", 135 Geophys. J. Int. 773–89 (Jul. 1998).

Sinah et al., "*Magmatic Processes at Slow Spreading Ridges: Implications of the RAMESSES Experiment at 57 deg. 45'N on the Mid–Atlantic Ridge,* " 135 Geophys. J. Int. 731–45 (Jul. 1998).

Sinah et al., "*Evidence for Accumulated Melt Beneath the Slow–Spreading Mid–Atlantic Ridge*," 355 Phil. Trans. R. Soc. Lond. A 233–53 (Jan. 1997).

Cheesman et al., "*On the theory of sea–floor conductivity mapping using transient electromagnetic systems*", Geophysics, vol. 52, No. 2, Feb. 1987, pp. 204–217.

Greaves et al., "*New Dimensions in Geophysics for Reservoir Monitoring*", pp. 141–150.

ELECTROMAGNETIC SURVEYING FOR MAPPING THE CONTENT OF SUBTERRANEAN RESERVOIRS

RELATED APPLICATION

This application is a continuation of application Ser. No. 09/763,446 filed Jul. 9, 2001, now U.S. Pat. No. 6,628,119 which claims priority to PCT Application No. PCT/GB99/02823 filed Aug. 26, 1999 and GB Application No. 98 18875.8 filed Aug. 28, 1998.

The present invention relates to a method and apparatus for determining the nature of submarine and subterranean reservoirs. More particularly, the invention is concerned with determining whether a reservoir, whose approximate geometry and location are known, contains hydrocarbons or water.

Currently, the most widely used techniques for geological surveying, particularly in sub-marine situations, are seismic methods. These seismic techniques are capable of revealing the structure of the subterranean strata with some accuracy. However, whereas a seismic survey can reveal the location and shape of a potential reservoir, it cannot reveal the nature of the reservoir.

The solution therefore is to drill a borehole into the reservoir. However, the costs involved in drilling an exploration well tend to be in the region of £25 m and since the success rate is generally about 1 in 10, this tends to be a very costly exercise.

It is therefore an object of the invention to provide a system for determining, with greater certainty, the nature of a subterranean reservoir without the need to sink a borehole.

According to one aspect of the invention, there is provided a method of determining the nature of a subterranean reservoir whose approximate geometry and location are known, which comprises: applying a time varying electromagnetic field to the strata containing the reservoir; detecting the electromagnetic wave field response; and analyzing the effects on the characteristics of the detected field that have been caused by the reservoir, thereby determining the content of the reservoir, based on the analysis.

A reservoir refers to a subsurface body of rock having sufficient porosity and permeability to store and transmit fluids. A reservoir is part of a complete petroleum system. Reservoirs are often represented by a series of maps for each of the layers in the reservoir. The series of maps may include maps of structure, gross thickness, net thickness, porosity, water saturation, and other required petrophysical characteristics. A map refers to a representation, on a plane surface and at an established scale, of the physical features of a part or whole of the Earths surface or of any desired surface or subsurface data, by means of signs or symbols. A common volume unit of measurement for oil produced from a reservoir in a field is barrels of oil per day. A volume of oil is equivalent to 42 United States gallons. A stock tank barrel is a measure of the volume of oil stored in a stock tank. A volume of gas may be measured as millions of standard cubic feet, with a predetermined standard condition being specified.

According to another aspect of the invention, there is provided apparatus for determining the nature of a subterranean reservoir whose approximate geometry and location are known comprising: means for applying a time varying electromagnetic field to the strata containing the reservoir; means for detecting the electromagnetic wave field response, and means for analyzing the effects on the detected field that have been caused by the reservoir, thereby enabling the content of the reservoir to be determined based on the analysis.

It has been appreciated by the present applicants that while the seismic properties of oil-filled strata and water-filled strata do not differ significantly, their electromagnetic resistivities/permittivities do differ. Thus, by using an electromagnetic surveying method, these differences can be exploited and the success rate in predicting the nature of a reservoir can be increased significantly. This represents potentially an enormous cost saving.

The technique is applicable in exploring land-based subterranean reservoirs but is especially applicable to submarine, in particular sub-sea, subterranean reservoirs. Preferably the field is applied using one or more stationary transmitters located on the earth's surface, and the detection is carried out by one or more stationary receivers located on the earth's surface. In a preferred application, the transmitter(s) and/or receivers are located on or close to the seabed or the bed of some other area of water. Conveniently, there will be a single transmitter and an array of receivers, the transmitter(s) and receivers being dipole antennae or coils, though other forms of transmitter/receivers can be used. Also, if improved directionality of the emitted field is desirable, then a plurality of transmitters with phase adjustment can be used.

Electromagnetic surveying techniques in themselves are known. However, they are not widely used in practice. In general, the reservoirs of interest are about 1 km or more below the sea bed. In order to carry out electromagnetic surveying in these conditions, with any reasonable degree of resolution, short wavelengths are necessary. Unfortunately, such short wavelengths suffer from very high attenuation. Long wavelengths do not provide adequate resolution. For these reasons, seismic techniques are preferred.

However, while longer wavelengths applied by electromagnetic techniques cannot provide sufficient information to provide an accurate indication of the boundaries of the various strata, if the geological structure is already known, they can be used to determine the nature of a particular identified formation, if the possibilities for the nature of that formation have significantly differing electromagnetic characteristics. The resolution is not particularly important and so longer wavelengths which do not suffer from excessive attenuation can be employed.

The resistivity of sea water is about 0.3 ohm-m and that of the overburden beneath the sea bed would typically be from 0.3 to 4 ohm-m, for example about 2 ohm-m. However, the resistivity of an oil reservoir is likely to be about 50 ohm-m. This large difference can be exploited using the techniques of the present invention. Typically, the resistivity of a hydrocarbon-bearing formation will be 20 to 400 times greater than water-bearing formation.

Due to the different electromagnetic properties of a gas/oil bearing formation and a water bearing formation, one can expect a reflection of the transmitted field at the boundary of a gas/oil bearing formation. However, the similarity between the properties of the overburden and a reservoir containing water means that no reflection is likely to occur.

The transmitted field may be pulsed, however, a coherent continuous wave with stepped frequencies is preferred. It may be transmitted for a significant period of time, during which the transmitter should preferably be stationary, and the transmission stable. Thus, the field may be transmitted for a period of time from 30 seconds to 60 minutes, preferably from 3 to 30 minutes, for example about 20 minutes. Preferably, the receivers are arranged to detect a direct wave and a wave reflected from the reservoir, and the analysis includes extracting phase and amplitude data of the reflected wave from corresponding data from the direct wave.

The direct wave, which progresses via the sea water and the surface layers of the overburden, will reach the receivers first and will be much stronger than the later reflected waves. In an alternative system, therefore, the direct wave may be suppressed, using known techniques. This means that the receivers used will not require such a large dynamic range.

Preferably, the wavelength of the transmission is given by the formula $$0.1s \leq \lambda \leq 10s;$$

where λ is the wavelength of the transmission through the overburden and s is the distance from the seabed to the reservoir. More preferably λ is from about 0.5s to 2s. This may be achieved by adopting a transmission frequency from 0.1 Hz to 1 kHz, preferably from 1 to 50 Hz, for example 20 Hz.

In a preferred regime, a first transmission is made at a first frequency and received by each receiver in a tuned array of receivers, then a second transmission is made at a second frequency and received by the same tuned array of receivers, the receivers being tuned to receive their respective transmission. This would probably be repeated several more times, though it may only be carried out once.

Preferably, the analysis includes comparing the results of the measurements taken with the results of a mathematical simulation model based on the known properties of the reservoir and overburden conditions.

Preferably, the distance between the transmitter and a receiver is given by the formula $$0.5\lambda \leq L \leq 10\lambda;$$

where λ is the wavelength of the transmission through the overburden and L is the distance between the transmitter and the first receiver.

Given that the distance s and the geometry of the reservoir will be known from previous seismic surveys, an optimum λ and L would be selected.

Where dipole antennae are used these may be fixed, however, they are preferably adapted antennae which can be tuned for optimum transmission and reception in dependence upon the frequency of the transmission and its wavelength through the overburden. This may be achieved by altering their effective length either by remote controlled relays or by electronic switching systems. In addition, the driving circuit may be tuned in order to increase the bandwidth.

Preferably, the analyzing means is arranged to analyze phase and amplitude.

If a location of interest is considered, a mathematical modeling operation may be carried out. Thus, the various relevant parameters, such as depth and expected resistivities of the various known strata in the overburden are applied to the mathematical model and the expected results are calculated in dependence upon whether a formation under consideration is oil-bearing or water-bearing. The theoretically predicted results can then be compared with the actual results achieved in the field in order to determine the nature of the formation.

The present invention also extends to a method of surveying subterranean measures which comprises; performing a seismic survey to determine the geological structure of a region; and where that survey reveals the presence of a subterranean reservoir, subsequently performing a method as described above.

The invention may be carried into practice in various ways and some embodiments will now be described by way of example with reference to the accompanying drawings, in which:

FIG. 1 is a schematic section of a system in accordance with the invention.

FIG. 1 shows a section through a region which has already been the subject of a seismic survey. The geological structure is known and consists of several strata which form an overburden 11 above a reservoir layer 12 and underlying strata 13. The top of the overburden is a seabed 14 above which is, of course, sea water 15.

In order to determine whether or not the reservoir layer 12 is hydrocarbon-bearing, an electromagnetic surveying technique is carried out. A vessel 16 lays a cable 17 on the seabed 14. The cable 17 includes an electromagnetic transmitter 18 and several receivers in the form of dipole antennae, three of which 21, 22, 23 are shown.

The thickness s of the overburden 11 is known to be 1000 m. The depth of the water is about 800 m, though this is of no particular significance. Under these circumstances, the distance 1 between the transmitter 18 and the middle antenna 22 is arranged to be 2000 m, i.e. 2s. The distance between adjacent antennae is about 100 m. In all, the length of the cable 17 is likely be about 4000 m.

When the cable 17 is in position on the seabed 14, the transmitter 18 is activated and transmits an electromagnetic field in the form of a wave. The transmission frequency is in the range of about 1 to 30 Hz and the specific value is selected to produce a wavelength λ in the overburden which is approximately equal to s, that is to say, λ≅1000 m. The transmitter 18 is tuned for optimum transmission and the antennae 21–23 are tuned to receive transmissions at λ=1000 m. The antennae 21–23 receive a direct wave 24 from the transmitter and also respective reflected waves 25, 26, 27 which are reflected by the reservoir layer 12 if the layer 12 is hydrocarbon-bearing. The received direct wave 24 and received reflected waves 25–27 are analyzed and compared with for example the results of forward modeling calculations based on the seismics and typical overburden electrical characteristics and from the results, a judgment can be made as to the nature of the layer 12.

Typically, a frequency of 20 Hz might be selected initially. This would result in a wavelength of 400 m in the sea water and a wavelength of about 1000 m in the overburden. The wavelength in the layer 12, if hydrocarbon-bearing would be about 5000 m. Under these circumstances, the attenuation would be:

| Direct Wave | |
| --- | --- |
| Antenna loss | −40 dB |
| Propagation loss | −110 dB |
| Reflected Wave | |
| Antenna loss | −40 dB |
| Propagation loss | −150 dB |
| Reflection loss | −20 dB |

The demanded dynamic range of the receiver system will then be 210 dB−150 dB=60 dB. By appropriate suppression of the direct wave, this demand will decrease dramatically and the resolution of the reflected signal will possibly be increased.

The transmission would be carried out for several minutes at a continuous power level of perhaps 10 kw.

This procedure is then repeated at a different frequency. This would result in different wavelengths and possibly consequent re-tuning of the antennae system. At a frequency of for example 5 Hz, the wavelength in sea water would be 800 m and the wavelength in the overburden, about 2000 m. The wavelength in the layer 12, if hydrocarbon-bearing, would be 10 km. The attenuation would be:

| Direct Wave | |
| --- | --- |
| Antenna loss | −40 dB |
| Propagation loss | −55 dB |
| Reflected Wave | |
| Antenna loss | −40 dB |
| Propagation loss | −75 dB |
| Reflection loss | −30 dB |

The demand for dynamic range of receiver system is now 145 dB−95 dB=50 dB.

In a preferred regime, the frequency would be increased stepwise over a range, for example 5 to 20 Hz.

The entire procedure can then be repeated in different locations and at different orientations. It will also be appreciated that by repeating the procedure after a period of production, the change in condition of a reservoir can be determined. This can be of value in assessing the positions in a particular field where hydrocarbons might still be present, and where the well might be depleted.

What is claimed is:

1. A method for recovering a volume of hydrocarbon from a submarine or subterranean reservoir comprising:
    conducting an electromagnetic survey to determine a content of the submarine or subterranean reservoir having an electromagnetic characteristic and having an approximate geometry and location that are known, comprising:
        applying a time varying electromagnetic field in the form of a wave to the strata containing the reservoir;
        detecting the electromagnetic wave field response;
        and analyzing the effects on the characteristics of the detected field that have been caused by the reservoir, thereby determining the content of the reservoir, based on the analysis, wherein the analysis comprises comparing the electromagnetic characteristic theoretically predicted for the reservoir based on the approximate geometry of the reservoir and based on the reservoir being a water-bearing or hydrocarbon-bearing reservoir to the electromagnetic characteristic for the reservoir that is determined from the detected electromagnetic wave field response of the reservoir, wherein a distance between a transmitter and a receiver is given by the formula $0.5\lambda \leq L \leq 10\lambda$; where $\lambda$ is the wavelength of the transmission through an overburden and L is the distance between the transmitter and the receiver;
    inferring from the electromagnetic survey that the volume of hydrocarbon is present in the reservoir; and
    producing the volume of hydrocarbon from a well that penetrates the reservoir.

2. The method of claim 1, wherein the volume of hydrocarbon comprises oil.

3. The method of claim 1, wherein the volume of hydrocarbon comprises natural gas.

4. The method of claim 1, wherein the field is applied using at least one stationary transmitter located on the earth's surface.

5. The method of claim 1, wherein the at least one transmitter is located proximate a bed of a body of water, the bed including a seabed.

6. The method of claim 1, wherein the field is transmitted for a period of time of from 30 seconds to 60 minutes.

7. The method of claim 1, wherein the at least one stationary receiver is arranged to detect a direct wave and a wave reflected from the reservoir, and the analysis includes extracting phase and amplitude data of the reflected wave from corresponding data from the direct wave.

8. The method of claim 1, wherein the wavelength of the applied time varying electromagnetic field wave is given by the formula $$0.1s \leq \lambda 10s;$$

where $\lambda$ is the wavelength of the transmission through an overburden overlying a reservoir and s is the distance from a seabed to the reservoir.

9. The method of claim 1, wherein, substantially
    $1=2s=2\lambda$, wherein s is a distance from a seabed located over the reservoir to the reservoir.

10. The method of claim 1, wherein the transmission frequency of the time varying electromagnetic field is from 0.1 Hz to 1 kHz.

11. The method of claim 1, wherein the analysis includes comparing the results of measurements taken with results of a mathematical simulation model based on known properties of the reservoir and conditions of an overburden.

12. The method of claim 1, including suppressing a direct wave, thereby reducing the required dynamic range of receivers receiving a reflected wave and increasing resolution of the reflected wave.

13. The method of claim 1, including as preliminary steps; performing a seismic survey to determine the geological structure of a region and analyzing the survey to reveal the presence of a subterranean reservoir.

14. The method of claim 1, wherein the electromagnetic characteristic theoretically predicted for the reservoir is a member of the group consisting of resistivity and permittivity.

15. The method of claim 1, further comprising equipping a vessel with the transmitter.

16. The method of claim 15 wherein the vessel is a ship.

17. The method of claim 15 wherein the transmitter is attachable to a cable that is attachable to the vessel whereby the transmitter may be deployed by the vessel.

18. The method of claim 15 wherein the transmitter comprises a dipole antenna.

19. The method of claim 1 further comprising drilling the well that penetrates the reservoir after inferring from the electromagnetic survey that the volume of hydrocarbon is present in the reservoir.

20. A method for determining a content of a submarine or subterranean reservoir having an electromagnetic characteristic and having an approximate geometry and location that are known, comprising:
    conducting an electromagnetic survey comprising applying a time varying electromagnetic field in the form of a wave to the strata containing the reservoir;
    detecting the electromagnetic wave field response; and
    analyzing the effects on the characteristics of the detected field that have been caused by the reservoir, thereby determining the content of the reservoir, based on the analysis, wherein the analysis comprises comparing the electromagnetic characteristic theoretically predicted for the reservoir based on the approximate geometry of the reservoir and based on the reservoir being a water-bearing or hydrocarbon-bearing reservoir to the electromagnetic characteristic for the reservoir that is determined from the detected electromagnetic wave field response of the reservoir, wherein a distance between a transmitter and a receiver is given by the formula $0.5\lambda \leq L \leq 10\lambda$; where $\lambda$ is the wavelength of the transmission through an overburden and L is the distance between the transmitter and the receiver; and preparing a map that comprises a depiction of at least a portion of the content of the reservoir as derived from the electromagnetic survey.

21. The method of claim 20, wherein the content of the reservoir comprises oil.

22. The method of claim 20, wherein the content of the reservoir comprises natural gas.

23. The method of claim 20, wherein the field is applied using at least one stationary transmitter located on the earth's surface.

24. The method of claim 20, wherein the at least one transmitter is located proximate a bed of a body of water, the bed including a seabed.

25. The method of claim 20, wherein the field is transmitted for a period of time of from 30 seconds to 60 minutes.

26. The method of claim 20, wherein the at least one stationary receiver is arranged to detect a direct wave and a wave reflected from the reservoir, and the analysis includes extracting phase and amplitude data of the reflected wave from corresponding data from the direct wave.

27. The method of claim 20, wherein the wavelength of the applied time varying electromagnetic field wave is given by the formula $0.1s \leq \lambda \leq 10s$;

where $\lambda$ is the wavelength of the transmission through an overburden overlying a reservoir and s is the distance from a seabed to the reservoir.

28. The method of claim 20, wherein, substantially $1=2s=2\lambda$, wherein s is a distance from a seabed located over the reservoir to the reservoir.

29. The method of claim 20, wherein the transmission frequency of the time varying electromagnetic field is from 0.1 Hz to 1 kHz.

30. The method of claim 20, wherein the analysis includes comparing the results of measurements taken with results of a mathematical simulation model based on known properties of the reservoir and conditions of an overburden.

31. The method of claim 20, including suppressing a direct wave, thereby reducing the required dynamic range of receivers receiving a reflected wave and increasing resolution of the reflected wave.

32. The method of claim 20, including as preliminary steps; performing a seismic survey to determine the geological structure of a region and analyzing the survey to reveal the presence of a subterranean reservoir.

33. The method of claim 20, wherein the electromagnetic characteristic theoretically predicted for the reservoir is a member of the group consisting of resistivity and permittivity.

34. The method of claim 20, further comprising equipping a vessel with the transmitter.

35. The method of claim 34 wherein the vessel is a ship.

36. The method of claim 34 wherein the transmitter is attachable to a cable that is attachable to the vessel whereby the transmitter may be deployed by the vessel.

37. The method of claim 34 wherein the transmitter comprises a dipole antenna.

38. The method of claim 34 further comprising drilling a well that penetrates the reservoir after inferring from the electromagnetic survey that the content of the reservoir comprises hydrocarbon.

* * * * *

UNITED STATES PATENT AND TRADEMARK OFFICE
CERTIFICATE OF CORRECTION

PATENT NO. : 7,026,819 B2  Page 1 of 1
APPLICATION NO. : 10/624287
DATED : April 11, 2006
INVENTOR(S) : Eidesmo et al.

It is certified that error appears in the above-identified patent and that said Letters Patent is hereby corrected as shown below:

Field 73:
Delete "Norgas" and insert --Norges--.
Delete "Institut" and insert --Institutt--.

Column 1, Line 51:
Delete "Earths" and insert --Earth's--.

Column 3, Lines 15, 36:
Delete each occurrence of "$\leqq$" and insert --$\leq$--.

Column 6, Line 18:
Delete "$\leqq$" and insert --$\leq$--.

Column 7, Lines 9, 36:
Delete each occurrence of "$\leqq$" and insert --$\leq$--.

Signed and Sealed this

Thirtieth Day of October, 2007

JON W. DUDAS
*Director of the United States Patent and Trademark Office*